United States Patent
Wang

(10) Patent No.: US 10,113,504 B2
(45) Date of Patent: Oct. 30, 2018

(54) ALUMINUM CYLINDER BLOCK AND METHOD OF MANUFACTURE

(71) Applicant: GM Global Technology Operations LLC, Detroit, MI (US)

(72) Inventor: Qigui Wang, Rochester Hills, MI (US)

(73) Assignee: GM GLOBAL TECHNOLOGIES LLC, Detroit, MI (US)

(*) Notice: Subject to any disclaimer, the term of this patent is extended or adjusted under 35 U.S.C. 154(b) by 352 days.

(21) Appl. No.: 14/966,512

(22) Filed: Dec. 11, 2015

(65) Prior Publication Data

US 2017/0167435 A1    Jun. 15, 2017

(51) Int. Cl.
| | |
|---|---|
| F02F 7/00 | (2006.01) |
| B22C 9/02 | (2006.01) |
| B22C 9/10 | (2006.01) |
| B23K 20/12 | (2006.01) |
| C21D 9/00 | (2006.01) |
| F02F 1/00 | (2006.01) |

(52) U.S. Cl.
CPC .............. *F02F 7/0085* (2013.01); *B22C 9/02* (2013.01); *B22C 9/10* (2013.01); *B23K 20/1215* (2013.01); *C21D 9/0068* (2013.01); *F02F 1/00* (2013.01); *F02F 2200/06* (2013.01)

(58) Field of Classification Search
CPC ............ Y10T 29/4927; Y10T 29/49272; F02F 2001/248; F02F 2001/249; F02F 2200/06; F02F 2200/08
See application file for complete search history.

(56) References Cited

U.S. PATENT DOCUMENTS

| | | | | |
|---|---|---|---|---|
| 4,284,041 A | * | 8/1981 | Rasch | B22D 19/0009 123/193.5 |
| 4,727,923 A | * | 3/1988 | Ebisawa | B22D 17/00 164/113 |
| 4,917,169 A | * | 4/1990 | Melde-Tuczai | B22C 9/10 164/369 |
| 5,121,786 A | * | 6/1992 | Kawase | B22D 17/00 164/108 |
| 5,188,071 A | * | 2/1993 | Han | F02F 1/108 123/195 R |
| 5,217,059 A | * | 6/1993 | Kuhn | B22C 9/10 123/195 R |
| 5,361,823 A | * | 11/1994 | Kuhn | B22D 19/0009 164/137 |
| 5,365,997 A | * | 11/1994 | Helgesen | B22D 19/0009 164/103 |

(Continued)

FOREIGN PATENT DOCUMENTS

| | | |
|---|---|---|
| CN | 203764892 U | 8/2014 |
| JP | 2012200736 A | 10/2012 |

*Primary Examiner* — Jason L Vaughan

(57) ABSTRACT

A cast cylinder block for an internal combustion engine includes a first and a second cylinder bore and a shared bore wall. The first cylinder bore includes a first bore wall and the second cylinder bore includes a second bore wall. The shared cylinder bore wall includes a first portion and a second portion. A portion of the first bore wall combines with a portion of the second bore wall to form the shared cylinder bore wall. The first portion of the shared bore wall is an as-cast portion. The second portion of the shared bore wall is a metal matrix composite.

13 Claims, 3 Drawing Sheets

(56) References Cited

U.S. PATENT DOCUMENTS

| | | | | |
|---|---|---|---|---|
| 5,463,989 A * | 11/1995 | Saaf | B22D 19/0009 | 123/193.5 |
| 5,732,671 A * | 3/1998 | Takami | B22D 19/0009 | 123/193.2 |
| 5,755,028 A * | 5/1998 | Takami | B22D 19/0009 | 29/888.06 |
| 5,800,902 A * | 9/1998 | Shimmell | B22D 19/02 | 123/198 P |
| 5,816,710 A * | 10/1998 | Warwick | F02F 7/0053 | 384/433 |
| 6,076,971 A * | 6/2000 | Warwick | F02F 7/0053 | 384/433 |
| 6,205,959 B1 * | 3/2001 | Smetan | F02F 7/0007 | 123/41.72 |
| 6,298,899 B1 * | 10/2001 | Baltz | B22C 9/103 | 164/28 |
| 6,357,412 B1 * | 3/2002 | Menzl | F02F 7/0053 | 123/195 H |
| 6,647,945 B2 * | 11/2003 | Harima | F02B 75/243 | 123/195 R |
| 7,566,504 B2 * | 7/2009 | Oda | B22D 19/00 | 428/577 |
| 7,629,057 B2 * | 12/2009 | Oda | B22D 19/00 | 384/129 |
| 2002/0185242 A1 * | 12/2002 | Newcomb | B22C 7/06 | 164/28 |
| 2002/0185248 A1 * | 12/2002 | Shade | B22C 9/103 | 164/137 |
| 2002/0185249 A1 * | 12/2002 | Singer | B22C 9/103 | 164/137 |
| 2002/0185250 A1 * | 12/2002 | Shade | B22C 9/103 | 164/137 |
| 2002/0185251 A1 * | 12/2002 | Kaminski | B22C 9/103 | 164/137 |
| 2005/0173091 A1 * | 8/2005 | Cantu-Gonzalez | B22D 19/0009 | 164/98 |
| 2005/0189083 A1 * | 9/2005 | Stahl, Jr. | B22C 9/08 | 164/58.1 |
| 2005/0247428 A1 * | 11/2005 | Cantu-Gonzalez | B22C 1/14 | 164/138 |

\* cited by examiner

ALUMINUM CYLINDER BLOCK AND METHOD OF MANUFACTURE

TECHNICAL FIELD

The present disclosure relates to metal casting and more specifically to aluminum cylinder block castings and methods of manufacture.

BACKGROUND

The statements in this section merely provide background information related to the present disclosure and may or may not constitute prior art.

A typical cast aluminum cylinder block includes a number of cylinders arranged in a number of configurations. In all or most configurations, some cylinders are aligned side-by-side so that it is possible for one cylinder to share the cast structure of a neighboring or adjacent cylinder. The resulting design enjoys a more compact and lighter engine assembly while providing more space in the engine bay for other vehicle components.

While the current engine block design achieves the initial purpose, the design is not as reliable initially and tends to degrade sooner after a number of vehicle miles or engine hours. The high mileage wear is a result of aluminum recession in the areas between the cylinders causing combustion gases to leak from one cylinder to the neighboring cylinder. This results in a failed head gasket and a very costly repair. Accordingly, there is a need in the art for an engine cylinder block that has improved initial reliability and long term robustness while maintaining design and weight improvements.

SUMMARY

The present invention provides an engine cylinder block for an internal combustion engine. The cylinder block includes a first and a second cylinder bore and a shared cylinder bore wall. The first cylinder bore includes a first bore wall. The second cylinder bore includes a second bore wall. Each of the first bore wall and the second bore wall include an inner periphery bore surface. The shared cylinder bore wall includes a first portion and a second portion. A portion of the first bore wall combines with a portion of the second bore wall to form the shared cylinder bore wall. The first portion of the shared cylinder bore wall is an as-cast portion. The second portion of the shared cylinder bore wall is a metal matrix composite.

In one example of the present invention, the cylinder block is cast in an aluminum alloy.

In another example of the present invention, the second portion of the shared cylinder bore wall is disposed in the first portion.

In yet another example of the present invention, a top surface of the second portion of the shared cylinder bore wall combines with a top surface of the first portion of the shared cylinder bore wall to form a portion of a head deck.

In yet another example of the present invention, a method of manufacturing the cylinder block includes a number of process steps. A first step provides a preform of a compacted powder. A second step disposes the preform into a prescribed position of a sand core tool cavity. A third step blows a sand and resin mixture into the sand core tool cavity, cures the sand and resin mixture, and removes the cured sand core including the preform from the tool cavity. A fourth step assembles the sand core including the preform with other sand cores and places the assembly into a mold. A fifth step casts the cylinder block. A sixth step executes a friction stir process for altering the preform to a metal matrix composite.

In yet another example of the present invention, the method further includes a seventh step for heat treating the cylinder block between the fifth and sixth steps or after the sixth step, an eighth step of cleaning the sand and excess metal from the cylinder block, and a ninth step of machining the cylinder block and assembling the cylinder block into an engine.

In yet another example of the present invention, the compacted powder of the preform is at least one of an intermetallic powder, an oxide, a carbide, and a nitride.

In yet another example of the present invention, the friction stir process includes utilizing a friction stir process tool having a flat shoulder and a threaded cylindrical pin.

In yet another example of the present invention, the friction stir process includes inserting a spinning friction stir process tool into the shared cylinder bore wall, generating heat, and mixing the aluminum alloy with the compacted powder to form the metal matrix composite.

The above features and advantages and other features and advantages of the present invention are readily apparent from the following detailed description of the best modes for carrying out the invention when taken in connection with the accompanying drawings.

DESCRIPTION

The following description is merely exemplary in nature and is not intended to limit the present disclosure, application, or uses.

Figure 1:
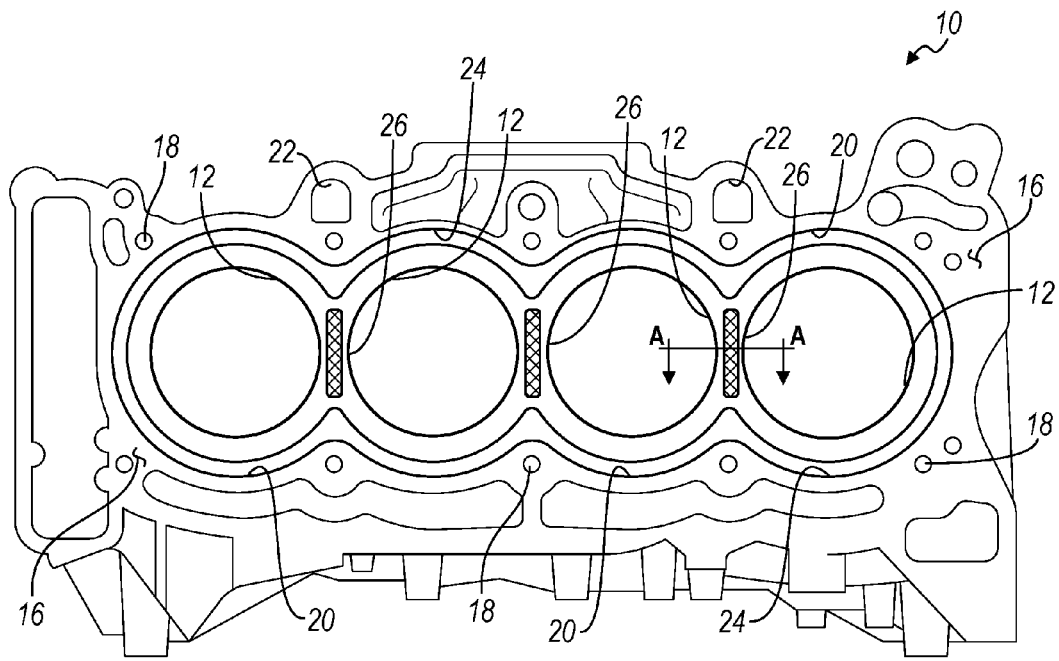
FIG. 1 is a perspective view of a cylinder block in accordance with the present invention.

Referring to FIG. 1, a cylinder block for an internal combustion engine, generally indicated by reference number 10, is illustrated and will now be described. The cylinder block 10 shown has several major features including a plurality of cylinder bores 12, a crankcase portion (not shown), a head deck 16, fastener holes 18, internal cooling cavities 20, and oil passages 22. More specifically, the plurality of cylinder bores 12 can include from two cylinder bores to sixteen or more cylinder bores. In this example, four cylinder bores 12 are aligned in an "I" formation such that each axis of the cylinder bores 12 are parallel to each other. In other examples, the cylinder bores 12 may be arranged in the shape of a "V", flat, or other arrangements without departing from the scope of the invention. A top end of each cylinder bore 12 terminates at the head deck 16 while the bottom end of each cylinder bore 12 terminates at the crankcase portion 14 of the cylinder block 10.

Regarding the plurality of cylinder bores 12, the cylinder bores 12 are arranged in a "Siamese" fashion. More specifically, each cylinder bore 12 shares a bore wall 26 with the adjacent cylinder bore 12. The resulting structure thus provides that a portion of the internal cooling cavities 20, known as a water jacket 24, does not have any portion of the cooling cavity 20 between the cylinder bores 12. The shared bore wall 26 allows for a more compact design and improves overall stiffness of the structure. The shared bore walls 26 are processed in a method 100 discussed in further detail below, to include a metal matrix composite (MMC) material in lieu of the parent cast metal.

Figure 2:
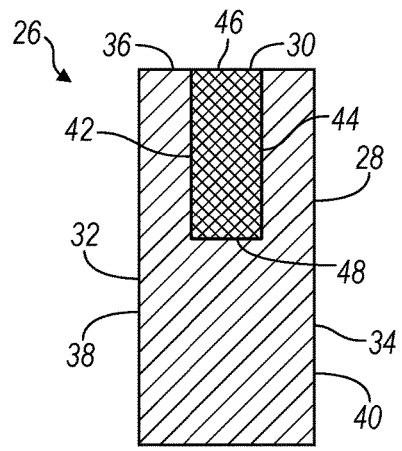
FIG. 2 is a cross section (A-A) of a portion of the cylinder block, in accordance with the present invention.

Referring now to FIG. 2, a cross-section of the shared bore wall 26 is illustrated and will now be described. The shared bore wall 26 includes a first or cast portion 28 and a second or MMC portion 30. The cast portion 28 is an as-cast metal portion having a first bore surface 32 and a second bore surface 34. The first bore surface 32 is the surface of a first bore 38, while the second bore surface 34 is the surface of a second bore 40 that is adjacent to the first bore 38. The cast portion 28 includes a top or head deck surface 36 that is at the same height as the head deck surface 16 of the cylinder block 10. The second portion 30 or MMC portion 30 is a portion of the shared bore wall 26 having a metal matrix composite structure. The MMC portion 30 has a first side 42, a second side 44 opposite the first side 42, a top or head deck surface 46, and a bottom surface 48. The MMC portion 30 is disposed in the center of the shared bore wall 26 such that the first side 42 of the MMC portion 30 is the same distance from the first bore surface 32 as the second side 44 is from the second bore surface 34. The head deck 46 of the MMC portion 30 is flush with the head deck surface 36 of the shared bore wall 26. The MMC portion 30 provides improved durability and strength in a localized area of the cylinder block 10. A typical failure mode at the head deck 46 is metal recession causing loss of cylinder pressure and head gasket failure. In addition to the failure itself, the repair for the failure is certainly expensive and possibly catastrophic.

Figure 3:
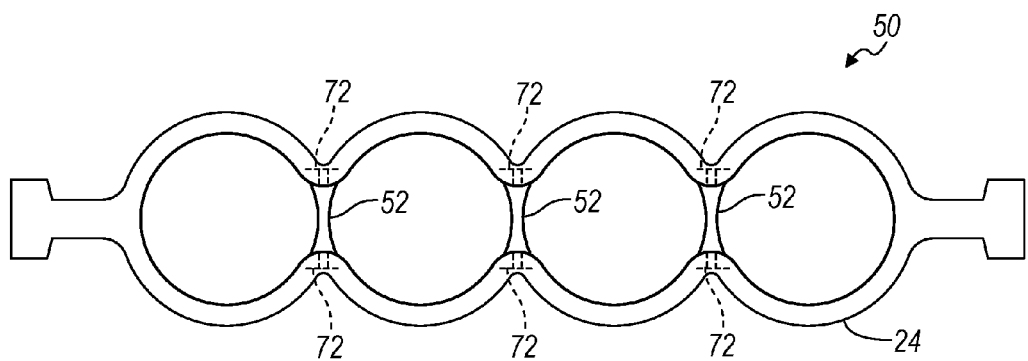
FIG. 3 is a plan view of a sand core for use in manufacturing the cylinder block, in accordance with the present invention.
Figure 4:
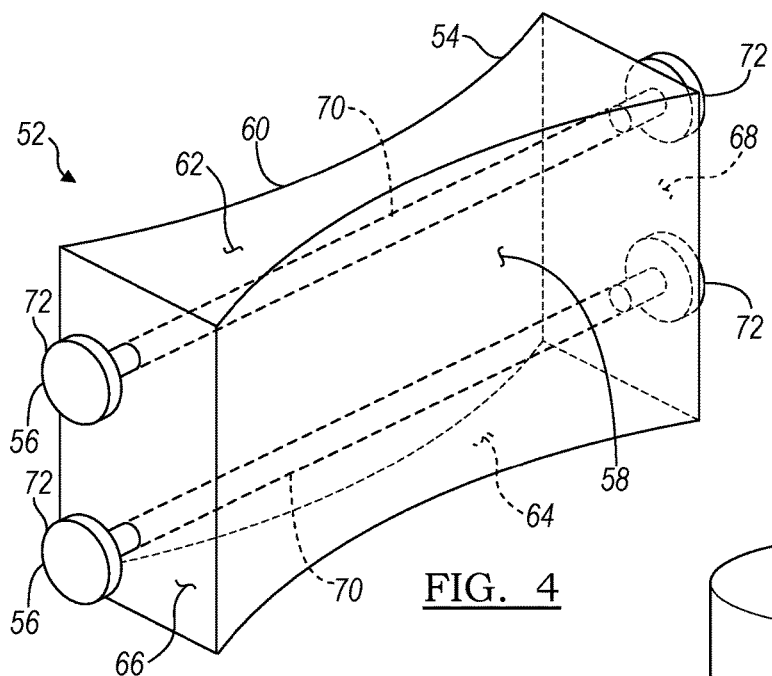
FIG. 4 is a perspective view of a cast-in insert, in accordance with the present invention.

Referring now to FIGS. 3 and 4, a sand core 50 used in the manufacture of the cylinder block 10 is shown in FIG. 3 and a preform 52 secured in the sand core 50 is shown in FIG. 4 and each will now be described. The sand core 50 is formed in a cavity tool from sand and cured resin. The sand core 50 shown is a sand core of the water jacket cavity 24 of the cylinder block 10. The water jacket 24 sand core 50 is assembled with other sand cores that form other features of the cylinder block such as the crankcase, bores, water pump, etc. The assembled cores are located in a mold that may include the outside features of the cylinder block along with risers and a gating system required to feed liquid metal to the internal cavities of the core assembly. Alternatively, other casting processes can be used to achieve a similar cylinder block 10. For example, an open head deck will allow the water jacket feature to be formed by a permanent mold instead of a sand core. In this case, the preform 52 would be set directly into the mold and not placed into a sand core. Thus the process can be adopted for high pressure, low pressure, lost foam, or other types of aluminum alloy casting processes. Furthermore, other types of metal alloys can be considered without departing from the scope of the invention. Variations of grey iron, magnesium, or other light metal castings may be improved through the process of the present invention.

As mentioned above, the sand core 50 is formed by blowing a sand and resin mix into a tool cavity. The mixture is then gassed to cure and harden the resin into the shape of the tool cavity. However, in forming this particular sand core 50 that includes the preforms 52, prior to blowing the sand and resin mix into the tool cavity, the preform 52 is placed in the tool cavity at specific locations. Then the sand and resin mix is blown into the tool cavity keeping the preforms 52 in their disposed positions. Next, the curing of the resin by gassing secures the preforms 52 in position.

The preform 52 shown in FIG. 4 includes a compacted powder portion 54 and a retainer portion 56. The compacted powder 54 is made of a micro or nano-scale oxide, carbide, nitride or other intermetallic powder such as alumina $Al_2O_3$ or silicon carbide SiC. The retainer portion 56 may be formed from aluminum or steel, however, other materials may be used without departing from the scope of the invention.

The compacted powder 54 is formed in a shape that follows the contours of the shared bore wall 26 of the cylinder block 10. For example, the compacted powder 54 includes a first concave side 58, a second concave side 60 opposite the first concave side 58, a top surface 62, a bottom surface 64 opposite the top surface 62, a first end 66 and a second end 68 opposite the first end 66. More specifically, the retainers 56 include an elongated wire portion 70 and a flat disc portion 72 secured to the ends of the wire portion 70. The wire portion 70 passes through the compacted powder 54 from the first end 66 to the second end 68. The disc portion 72 remains exposed from the compacted powder 54 until the compacted powder 54 is placed in the tool cavity and the sand core 50 is blown and cured. When the sand core 50 is removed from the tool cavity, the disc portion 72 is encased in hardened sand and resin while the compacted powder 54 is exposed. The preform 52 may also be combined with the sand core 50 on other manners without departing from the scope of the invention. For example, the sand core 50 may be formed without the preform 52 while having the preform 52 inserted into a slot of the sand core 50 prior to the cores are assembled in the mold.

Figure 6:
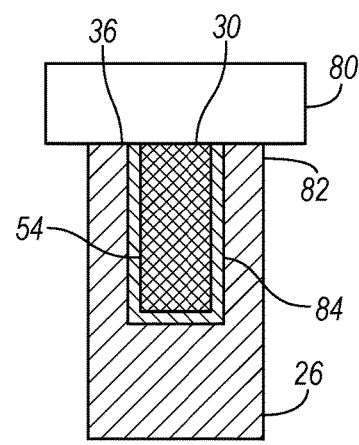
FIG. 6 is a cross-section (A-A) of the portion of the cylinder block in process with a spin weld tool, in accordance with the present invention.
Figure 5:
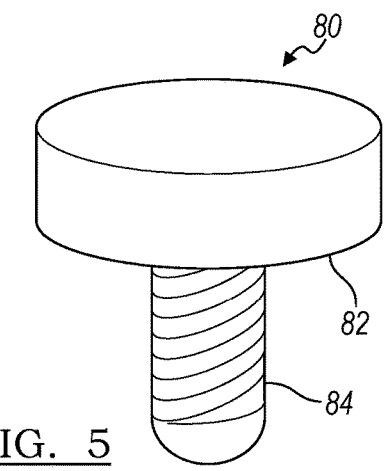
FIG. 5 is a perspective view of a spin weld tool, in accordance with the present invention.

Turning now to FIGS. 5 and 6, an additional process step in forming the cylinder block 10 is illustrated and will now be described. After the cylinder block 10 is cast and the sand is removed, an addition process step is required to form the MMC portion 30 of the shared bore wall 26. However, a heat treating process or other cleaning, flash removal, or cubing process may be performed prior to this process step without departing from the scope of the invention. The additional process step includes using a friction stir process to alter the compacted powder 54 to a metal matrix composite. FIG. 5 illustrates the friction stir process tool 80 having a flat shoulder 82 and a threaded cylindrical pin 84. FIG. 6 shows the step of the process wherein the stir process tool 80 spins and is inserted into the MMC portion 30 of the shared bore wall 26. As the stir process tool 80 spins, the tool 80 generates heat and mixes the adjacent portion of parent metal aluminum with the material of the compacted powder 54 and forms the MMC.

Figure 7:
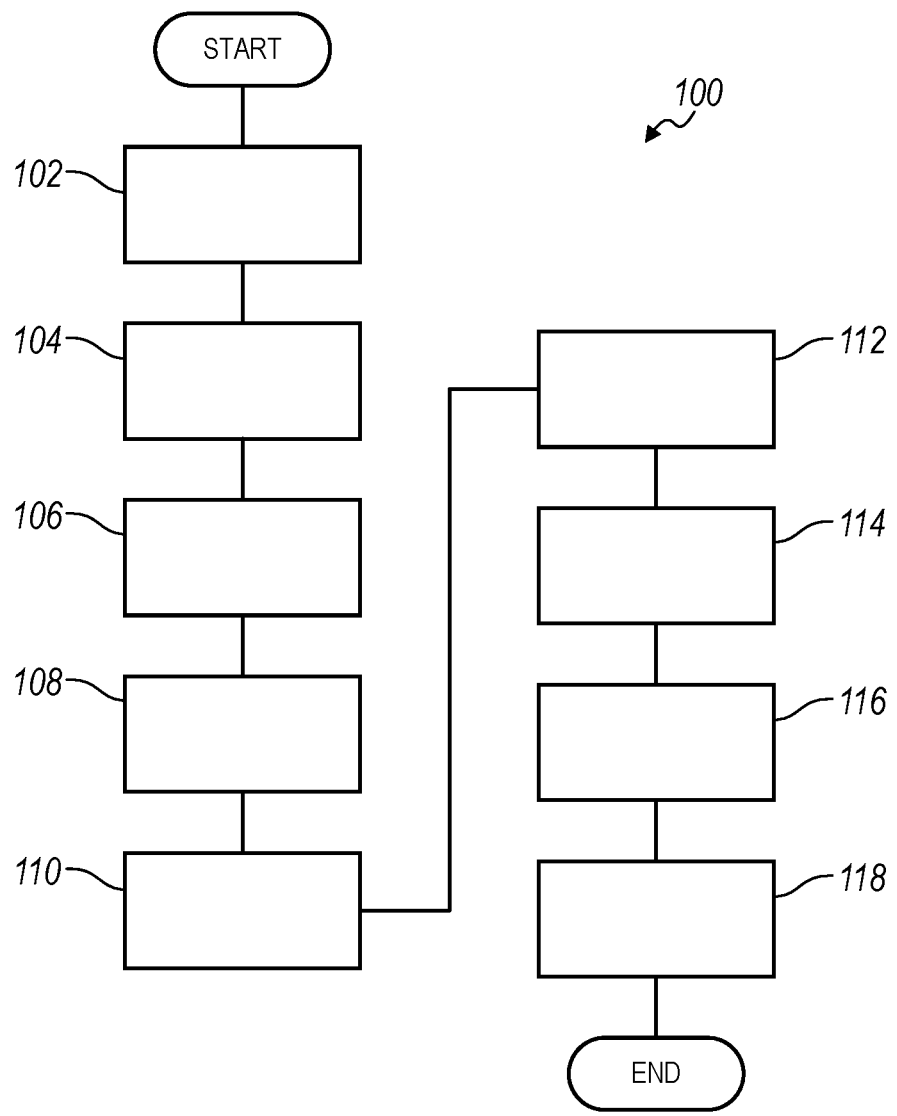
FIG. 7 is a flowchart depicting a method of manufacturing a cylinder block, in accordance with the present invention.

Turning attention to FIG. 7, the process or method 100 for manufacturing a cylinder block 10 is illustrated in a flowchart and will now be described. The first step 102 of the method 100 includes providing a preform 52 having a compacted powder portion 54 made from an oxide, carbide, nitride or other intermetallic powders. A second step 104 includes disposing the preform 52 into the prescribed position of a sand core tool cavity. A third step 106 includes blowing and curing a sand and resin mixture into the sand core tool cavity and removing the cured sand core 50 including the preform from the tool cavity. A fourth step 108 includes assembling the sand core 50 including the preform 52 with other sand cores and placing the assembly into a mold. A fifth step 110 includes casting the cylinder block 10. A sixth step 112 includes cleaning the sand and excess metal from the cylinder block 10. A seventh step 114 includes heat treating the cylinder block 10. An eighth step 116 includes executing the friction stir process as described above. A ninth step 118 includes machining the cylinder block 10 and assembling the cylinder block 10 into an engine.

While the best modes for carrying out the invention have been described in detail, those familiar with the art to which this invention relates will recognize various alternative designs and examples for practicing the invention within the scope of the appended claims.

The following is claimed:

1. A method of manufacturing a cylinder block having a shared cylinder bore wall with a portion of the shared cylinder bore wall including a metal matrix composite, the method comprising:
    providing a preform of a compacted powder;
    disposing the preform into a prescribed position of a sand core tool cavity;
    depositing a sand and resin mixture into the sand core tool cavity, curing the sand and resin mixture into a cured sand core, and removing the cured sand core from the tool cavity;
    assembling the cured sand core into a sand core assembly and placing the sand core assembly into a mold;
    pouring an aluminum alloy into the mold to form the cylinder block;
    cleaning the cylinder block after allowing the aluminum alloy to solidify; and
    executing a friction stir process for mixing the preform with a portion of the aluminum alloy that is adjacent to the preform to form a metal matrix composite.

2. The method of manufacturing the cylinder block of claim 1 further comprising heat treating the cylinder block.

3. The method of manufacturing the cylinder block of claim 1 wherein providing a preform of a compacted powder further comprises providing a preform of a compacted powder including at least one of an intermetallic powder, an oxide, a carbide, and a nitride.

4. The method of manufacturing the cylinder block of claim 1 wherein the executing of the friction stir process further comprises executing the friction stir process using a friction stir process tool having a flat shoulder and a threaded cylindrical pin for mixing the preform with the adjacent aluminum alloy to form the metal matrix composite.

5. The method of manufacturing the cylinder block of claim 1 wherein the executing of the friction stir process further comprises inserting a friction stir process tool into the shared cylinder bore wall and generating heat for mixing the preform with the adjacent aluminum alloy to form the metal matrix composite.

6. The method of manufacturing the cylinder block of claim 1 wherein depositing a sand and resin mixture into the sand core tool cavity, curing the sand and resin mixture into a cured sand core, and removing the cured sand core from the tool cavity further comprises depositing a sand and resin mixture into the sand core tool cavity, curing the sand and resin mixture into a cured water jacket sand core, and removing the cured water jacket sand core from the tool cavity.

7. The method of manufacturing the cylinder block of claim 1 wherein providing a preform of a compacted powder further comprises providing a preform of a compacted powder having at least one retainer.

8. A method of manufacturing a cylinder block having a shared cylinder bore wall with a portion of the shared cylinder bore wall including a metal matrix composite, the method comprising:
    providing a preform of a compacted powder including at least one of an intermetallic powder, an oxide, a carbide, and a nitride;
    disposing the preform into a prescribed position of a sand core tool cavity;
    depositing a sand and resin mixture into the sand core tool cavity, curing the sand and resin mixture into a cured sand core, and removing the cured sand core from the tool cavity;
    assembling the cured sand core into a sand core assembly and placing the sand core assembly into a mold;
    pouring an aluminum alloy into the mold to form the cylinder block;
    cleaning the cylinder block after allowing the aluminum alloy to solidify; and
    executing a friction stir process for mixing the preform with adjacent aluminum alloy to form a metal matrix composite.

9. The method of manufacturing the cylinder block of claim 8 wherein executing a friction stir process for mixing the preform with adjacent aluminum alloy to form a metal matrix composite further comprises heat treating the cylinder block and executing a friction stir process for mixing the preform with adjacent aluminum alloy to form a metal matrix composite.

10. The method of manufacturing the cylinder block of claim 8 wherein executing a friction stir process for mixing the preform with adjacent aluminum alloy to form a metal matrix composite further comprises executing a friction stir process using a friction stir process tool having a flat shoulder and a threaded cylindrical pin for mixing the preform with adjacent aluminum alloy to form a metal matrix composite further comprises.

11. The method of manufacturing the cylinder block of claim 8 wherein executing a friction stir process for mixing the preform with adjacent aluminum alloy to form a metal matrix composite further comprises executing a friction stir process, inserting a friction stir process tool into the shared cylinder bore wall and generating heat for mixing the preform with adjacent aluminum alloy to form a metal matrix.

12. The method of manufacturing the cylinder block of claim 8 wherein depositing a sand and resin mixture into the sand core tool cavity, curing the sand and resin mixture into a cured sand core, and removing the cured sand core from the tool cavity further comprises depositing a sand and resin mixture into the sand core tool cavity, curing the sand and resin mixture into a cured water jacket sand core, and removing the cured water jacket sand core from the tool cavity.

13. The method of manufacturing the cylinder block of claim 8 wherein providing a preform of a compacted powder further comprises providing a preform of a compacted powder having at least one retainer.

* * * * *